United States Patent
Shalit

Patent Number: 5,115,229
Date of Patent: May 19, 1992

[54] METHOD AND SYSTEM IN VIDEO IMAGE REPRODUCTION

[76] Inventor: Hanoch Shalit, 86 Edwards St. - #2A, Roslyn, N.Y. 11577

[21] Appl. No.: 544,232

[22] Filed: Jun. 26, 1990

Related U.S. Application Data

[63] Continuation-in-part of Ser. No. 275,218, Nov. 23, 1988, Pat. No. 4,939,581.

[51] Int. Cl.⁵ .............................................. G09G 3/02
[52] U.S. Cl. .................................. 340/716; 324/404; 340/717
[58] Field of Search ................... 358/10, 69, 139, 107, 358/903, 76; 324/404; 340/716, 717, 793

[56] References Cited

U.S. PATENT DOCUMENTS

| | | | |
|---|---|---|---|
| 3,401,331 | 9/1968 | Mussulman | 324/404 |
| 3,657,550 | 4/1972 | Brown et al. | 324/404 |
| 3,725,901 | 4/1973 | Lehari et al. | 340/793 X |
| 4,955,680 | 9/1990 | Froese-Peeck et al. | 358/10 X |
| 4,962,425 | 10/1990 | Rea | 358/903 |
| 4,989,072 | 1/1991 | Sato et al. | 358/903 X |

*Primary Examiner*—Ulysses Weldon
*Attorney, Agent, or Firm*—Eliot S. Gerber

[57] ABSTRACT

A system and method for the accurate reproduction of the tone and luminance of a first video monitor screen includes, in one embodiment, a first video monitor and a second video monitor, each with a CRT screen. A gray scale test pattern is shown on both screens. The test pattern on each screen is measured using a spot photometer and the results are entered into a computer memory look-up table and compared, a tone-by-tone basis. A set of corrections is obtained for each tone of the gray scale. Those compensating corrections are used to adjust the luminance, on a pixel-by-pixel basis, of the second video screen of the second video monitor, so that the second screen is compensated to produce a gray scale which reproduces the tone and luminance values of the gray scale on the first screen.

12 Claims, 4 Drawing Sheets

METHOD AND SYSTEM IN VIDEO IMAGE REPRODUCTION

RELATED APPLICATION

This application is a continuation-in-part based upon application Ser. No. 07/275,218 filed Nov. 23, 1988, now U.S. Pat. No. 4,939,581.

BACKGROUND OF THE INVENTION

1. Field of the Invention

The present invention relates to the compensation of a video image on one video monitor to provide an accurate reproduction of the tonal luminance and tonal luminance difference ratios and color of the image on another video monitor.

2. Description of the Prior Art

At the present time, in a number of fields, a video image on one video monitor is part of the image reproduction chain, and it is desired that a video image on another video monitor be an accurate reproduction of the tonal luminance differences of the first image. For example, in the medical field a CAT X-ray scan, an ultrasonic scan, an NMR scan (nuclear magnetic resonance) or thermograph image is produced on a video monitor CRT (cathode ray tube) screen for immediate viewing by the technical personnel operating the instrument. Simultaneously the same image is produced on another video CRT screen for view by the physician.

In the printing field it is sometimes desired to make an accurate printed picture in various cities or at different times from the image on a video monitor screen. For example, the screen may show a computer-generator image. That image is reproduced on a photosensitive material or directly on a printing plate to print a hard copy that should be similar in tone, luminance and color to the original object or scene. It may also be desired that the image reproduced by a VCR be an accurate reproduction of the original real time image.

It has been found that video image reproduction may vary significantly from the original image on the video monitor screen. Some of the distortions are due to the inaccuracy of the CRT screen and video image reproduction process. That type of distortion has been recognized and compensation methods have been suggested, generally dealing with the problem as it affects an entire group of video monitors. Similarly, for hard copy reproduction the distortions due to the camera have been recognized and treated, generally by improvements in the optics of the camera or overall corrections in video components (brightness, contrast, etc.). However, many of the distortions are not predictable and may vary form day to day and from one monitor or VCR to another.

Set forth below is a discussion of the problems most frequently encountered in producing an accurate picture in the video-to-video process as it relates to accurate tonal black-white reproduction. The contribution of each problem to the total final distortion of the image can change in its characteristics periodically and is not predictable. One-day the CRT power may be incorrect and seriously distort the picture, and the next day it may still be incorrect but have only a minor adverse effect due to partial compensation distortions from other components in the system. In addition, most of the problem-causing effects are non-linear, so that complete compensating for them in a simple direct way is impossible.

The problems with the conventional system are explained in connection with FIG. 1A which is a block diagram of a conventional black-white video system. As shown in FIG. 1A, the video image is produced by the video source 10, which may be a video camera, a computer graphics output, or a VCR. The video signal is viewed directly on the first monitor CRT screen 11. The same video image is shown on a second CRT screen 13 of the second monitor 14. Generally the image on screen 13 is a positive image compared to the image on monitor screen 11.

Each step of this conventional process gives rise to unpredictable distortions. The first set of distortions arises in the CRT device, and its screen 13, which is part of the monitor 14. The ratio between luminance values, i.e., the ratio between shades of gray, on the screen 13 and/or the screen 11 may be different. For example, either or both CRT tubes may be unevenly coated with phosphor, or may be aged or may be subject to glare. In addition, the relationship of the signal voltage applied to produce a certain brightness is not linear. Consequently, the small differences in voltage may give rise to relatively large differences in brightness. A detailed description of the inaccuracy of a CRT distortion in an electronic camera, is found in Schwenker, R. P., "Film Selection Considerations For Computed Tomography and Ultrasound Video Photography": *Proc. SPIE - Appl. of Optical Instrumentation In Medicine,* VII, 1979; 173, pgs. 75-80.

The present invention is particularly directed to accurate reproduction of the luminance differences in value (differences in a gray scale) and absolute luminance on a black-white video screen. However, in its broader aspects, the invention is also applicable to the accurate reproduction of color images. The invention is directly applicable to color images in the sense that the video screen may be a color CRT screen and the invention will correct for gray scale distortions in reproducing the image on the color screen. In addition, the reproduction of color images has its own set of problems and distortions, aside from black-and-white tonal differences. These color distortions can also be corrected, and their correction will be discussed at the end of the detailed description.

These color and luminance distortions include that the original object color is not exactly matched to the phosphors on the CRT screen so that the color on the screen does not match the original object color. A further problem with color, not found in black-white images, is that the perception of color of the object or video screen (by the human eye) differs from the actual color.

In the U.S. Pat. No. 4,263,001 entitled "Apparatus and Method For Enhancement of Optical Images", in one embodiment, which is not claimed, a video camera is connected to an electronic image modification divide which, in turn, is connected to a single frame storage, to prevent feedback, and a monitor CRT.

In U.S. Pat. Nos. 4,492,987 and 4,520,403 both entitled "Processor For Enhancing Video Signals For Photographic Reproduction", the screen of an electronic camera is electronically modified to enhance photographic reproduction. The entire screen is treated as a unit and its brightness or color is changed in accordance with the distortion introduced by a selected photographic film.

In U.S. Pat. No. 4,658,286 entitled "Method and Apparatus For Correcting Distortions in Reproducing Systems", a type of feedback system is described. In one embodiment three photocells look at a corner of the CRT screen having test colors and their outputs are compared to reference colors.

OBJECTIVES AND FEATURES OF THE INVENTION

It is an objective of the present invention to provide a more accurate black-white video image on a second video monitor from the image on a first video screen in which the second image more accurately maintains the relative and absolute (for luminance reproduction) tonal scale of gray tones.

It is a further objective of the present invention that such second video image be compensated to obtain an accurate image and that such compensation takes account of short term, for example, daily distortions, and long-term distortions and fixed sources of distortions.

It is a still further objective of the present invention that the operator is alerted to excessive deviations from a standard of tonal reproduction so that he may take immediate corrective action to restore the system so that it will produce video reproductions with accurate tones.

It is a feature of the present invention to provide a method and system for the accurate tone reproduction of the luminance ratios in a black-white image. In one embodiment the original image may be viewed on a first monitor CRT and it is also shown on the CRT screen of a second video monitor. The second video monitor has means to vary the luminance values (brightness-darkness) of each pixel on its screen. A test image is shown on the second CRT screen, the test image having areas differing in luminance, for example, a ten-segment gray scale. A photoelectric photometer is used to test the luminances of each segment of the test pattern on the second screen. The luminance values, in digital format, are entered into a video processor computer having a look-up table whose entries are compared to table entries representing the luminance for each tone from the same test image shown on the first monitor. The look-up table provides a compensation value for each of the second monitor CRT tones.

When a certain pixel is to be activated on the CRT screen, its original brightness value is compensated for by the compensation value. Consequently, for example, an original lighter gray tone may be compensated to become brighter and an original darker gray tone may be compensated to become darker. In this way, in the same video frame, some pixels are made brighter and some pixels are made darker, in order to compensate for the distortions arising from the video reproduction process.

SUMMARY OF THE INVENTION

The present invention uses the same components as a conventional multi-monitor television system and, in addition, uses additional means to provide a rapid compensation so that the black-white tones (luminance differences on a video screen) and color are accurately reproduced on the different video monitors in the system.

The system, in one embodiment, uses a video source, such as a computer graphics output, VCR or video camera to produce an image on an original ("first") video monitor (on the first video screen). The video source simultaneously also produces the same image on a second screen of an auxiliary ("second") monitor.

The video system of the second video monitor is connected to a video processor computer. In one embodiment, the computer is a digital computer having a look-up table memory and an image frame memory. The computer's image memory processes each frame of the video image on a pixel-by-pixel basis in digital form.

A black-white gray scale test pattern is shown on the first and second screens, the test pattern having preferably at least 10 gray-scale areas. Each of the 10 gray scale areas of the test pattern area on each screen are measured by a spot photometer. The photometer's output, in digital form, is entered into the computer. The photometer's output from the first screen is held in memory and becomes the standard. Then, preferably daily or at least weekly, the photometer's output from measuring the second screen is also entered into the computer. The computer, using its look-up table memory, will determine the required compensation for the second video monitor on a pixel-by-pixel basis i.e., each pixel may be compensated. That compensation is applied to each video frame which passes through the computer's image memory and is applied from the image memory to the second video monitor.

The computer memory includes a "standard" set of luminance values corresponding to the luminance values for each tone derived from the measurements made by the photometer at the first video screen. Those standard values are compared to the actual values, from the photometer's measurements of the test pattern on the second screen to provide the required compensation. The compensation is non-linear so that making the entire video screen darker or brighter will not compensate for the distortions in the ratios between the tones. Instead, each tone requires its own compensation. Since an image is composed of different tones in different areas of the video screen, the luminance (brightness) value of each tiny area (pixel) is individually compensated to produce the tonal reproduction accurately.

The system and method of the present invention does not attempt to bring the various video screens of the system to a common ideal standard, as might be done in the quality control operation in the manufacturing of video monitors. Instead it provides the same image on a plurality of screens regardless of the quality of that image. For example, if the first video monitor ("the original monitor") has a loss of image accuracy, due to age or other causes, then the second monitor ("auxiliary monitor"), and other auxiliary monitors in the system, will produce the same inaccurate image as on the original first monitor.

The present invention may also be used for quality control. The original video image on the original monitor is made the comparison constant standard. The following monitor screens are then compensated so they are identical to the original screen. For example, this process may be used by a video monitor manufacturer to control the quality of a series of monitors so that they all are adjusted to show identical images compared with an original monitor.

BRIEF DESCRIPTION OF THE DRAWINGS

Other objectives and features of the present invention will be apparent from the following detailed description of the inventor's presently known best mode of practicing the invention, take in conjunction with the accompanying drawings.

In the drawings.

DETAILED DESCRIPTION OF THE INVENTION

The present invention relates, in the below-described first embodiment, to the accurate reproduction of the black-white tone on the screen ("second screen") of a second video monitor ("auxiliary" or "slave" monitor) as is found on the screen ("first screen") of a first video monitor ("original or master monitor").

The "tone" of an image is the ratio between the luminance values (brightness) of the screen image. That tone ratio is sometimes called "luminance differences" or "shades of gray" or a "gray scale".

An accurate reproduction of the ratio of luminance values (gray scale) would occur when the ratio of luminance units on the second "auxiliary" screen directly corresponds (linear relationship) to the gray scale on the first "original" screen. The "screen luminance" is the brightness of the video screen, or a portion of the screen, and is measured in terms of luminance ($cd/m^2$). A close approximation to the human eye perception of "brightness" differences is in terms of "log luminance".

Figure 1A:
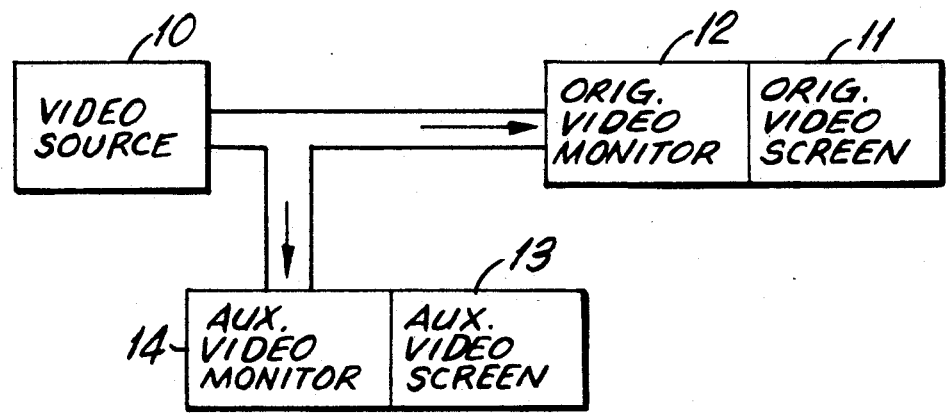
FIG. 1A is a block diagram of one embodiment of the prior art system.
Figure 1B:
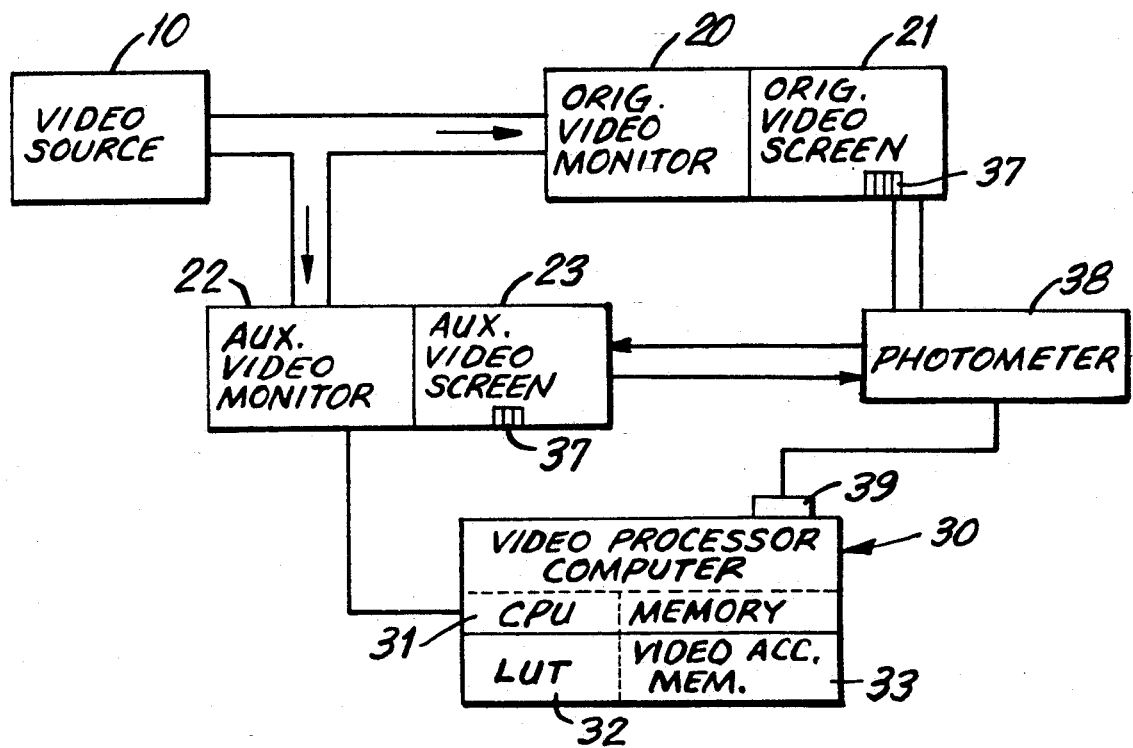
FIG. 1B is a block diagram of the system of the present invention to produce an accurate reproduced video screen image.

The video screen can be divided into "pixels" with the pixels arranged in columns and rows. The video screen may be the screen of a CRT (cathode ray tube), LCD (liquid crystal display) or other image display device. It may also be an analog screen that is only divided to rows not columns. The number of pixels which is selected depends on the original image generator and the viewing screen, i.e., the medical scanner output, the screen size, the electronics of the monitor device (video electronics) and the video system which is used. In the United States there are various standards of video systems for medical purposes. For convenience, we may consider a system of 1000 horizontal lines and each line may be considered as 1000 pixels so the total number of pixels comprising the CRT screen is $1000 \times 1000$, or one million pixels. As explained below, using digital image processing device (memory store) for each pixel value, it is possible to change the back-white value of each pixel. In the case of an 8-bit digital system, each pixel has a black-white gray scale of 256 values from 1 (blackest) to 256 (brightest), on the monitor screen. As shown in FIG. 1B, a block diagram of the first embodiment, a first original monitor video 20 ("original monitor") includes a CRT screen 21 ("first screen"). A second monitor 22 ("auxiliary" or "slave monitor") also includes a CRT screen 23 ("second screen"). The monitors 20 and 22 show an image which, in this embodiment, is a black-white image. Alternatively, the image may be a color image in which case correction of the tone of the reproduction by itself, and without correction of color, will greatly improve the accuracy of the color reproduction, for example, an 80% improvement.

The monitors 20 and 22 are connected to a video source 10, which may be a medical image producing device, a VCR, a TV set tuned to the same channel, a computer graphics output or video camera. The monitors 20 and 22 are preferably high resolution video monitors having 1000 horizontal lines per video frame, each frame consisting of two interlaced fields each of 500 horizontal lines. There is no attempt, in this example, to enhance the image on the second monitor 22 compared to some ideal; but only to enhance the reproduced image so that it accurately matches the image on the first monitor screen 21.

The same image which appears on the first monitor screen 21 also appears on the second screen 23 of the video monitor 22. The image on CRT screen 23 is preferably the direct image of the image on the screen of the monitor 20.

The monitor 22 is connected to the electronic video processor computer 30 which calculates the correction values and controls the luminance of the second CRT screen 23 on a pixel-by-pixel basis. In this example, the CRT screen with its 1,000 horizontal lines per field (500 per frame and 2 fields each 1/60th second) is preferably divided so that each line has 500 pixels for a total of one million pixels per frame. Video images are conventionally generated in an interlaced fashion wherein every other line in the image frame is generated during one field interval and the alternative lines are generated during the next field interval.

The video processor computer 30 includes a digital microcomputer, for example, Intel, having a CPU (central processing unit) 31. The processor has three digital memories, which are preferably solid-state VLSI chips (Very Large Scale Integrated). The first memory 32 is a read-write LUT look-up table which includes, as one set of data entered and then held therein, the "standard" brightness (luminance) value that a pixel should receive to correctly portray each tone of the gray scale ("standard value") so that it matches the corresponding tone on the first screen 21.

The second memory is a video access memory 33 which stores at least one field of the digital memory. Video access memories are characterized by a serial access port through which the video data can be input and output independently of other memory signaling and timing requirements. The present state of the art in these components is a $64K \times 4$ device solid state integrated random access memory circuit ("RAM chip") with an internal $256 \times 4$ serial access buffer. Suitable devices are Hitachi (HM53461 or HM53462), Fujitsu (MB81461), and Mitsubishi (M5M4C264) for NTSC video signals.

A photometer 38, for example, "Minolta LS 100", having a digital output, is connected to the video processor computer 30 through interface 39. The photometer 38 measures the values of the test pattern 37 on the first screen 21 and second screen 23. The test pattern is preferably a band of 11 side-by-side panels of different predetermined tones of gray forming a gray scale. Alternatively, the gray scale may be obtained from a series, for example, 11, images shown in sequence. The brightness measured on the screens 21 and 23 appears as digital electrical signals at the output of photometer 38. In the case where the test pattern has 11 panels, the user brings the photometer next to the screen and turns on the photometer 11 times on each screen, i.e. once for each panel on each screen.

The digital values representing the actual luminance of the gray scale of the test pattern from screen 21 are entered into the computer 30 which forms a look-up table 32. For each actual luminance value of a gray tone there is, stored in the look-up table 32, a "standard" value, which is the value at each pixel, of the test pattern 37, on the first screen 21.

Figure 2:
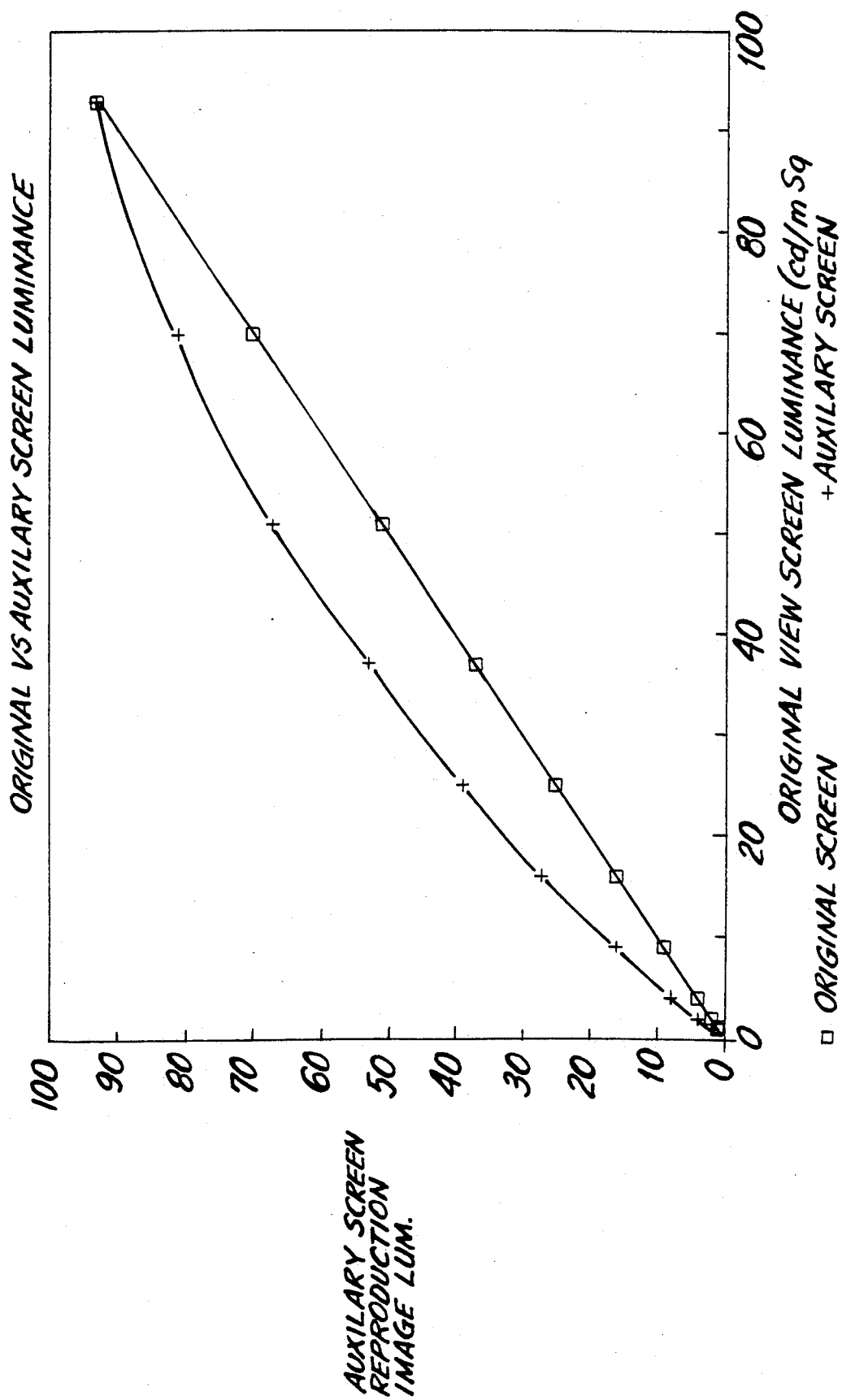
FIG. 2 is an X-Y graph in which the auxiliary screen reproduction image (luminance) (Y axis) is plotted against original screen image luminance (X axis)
Figure 3:
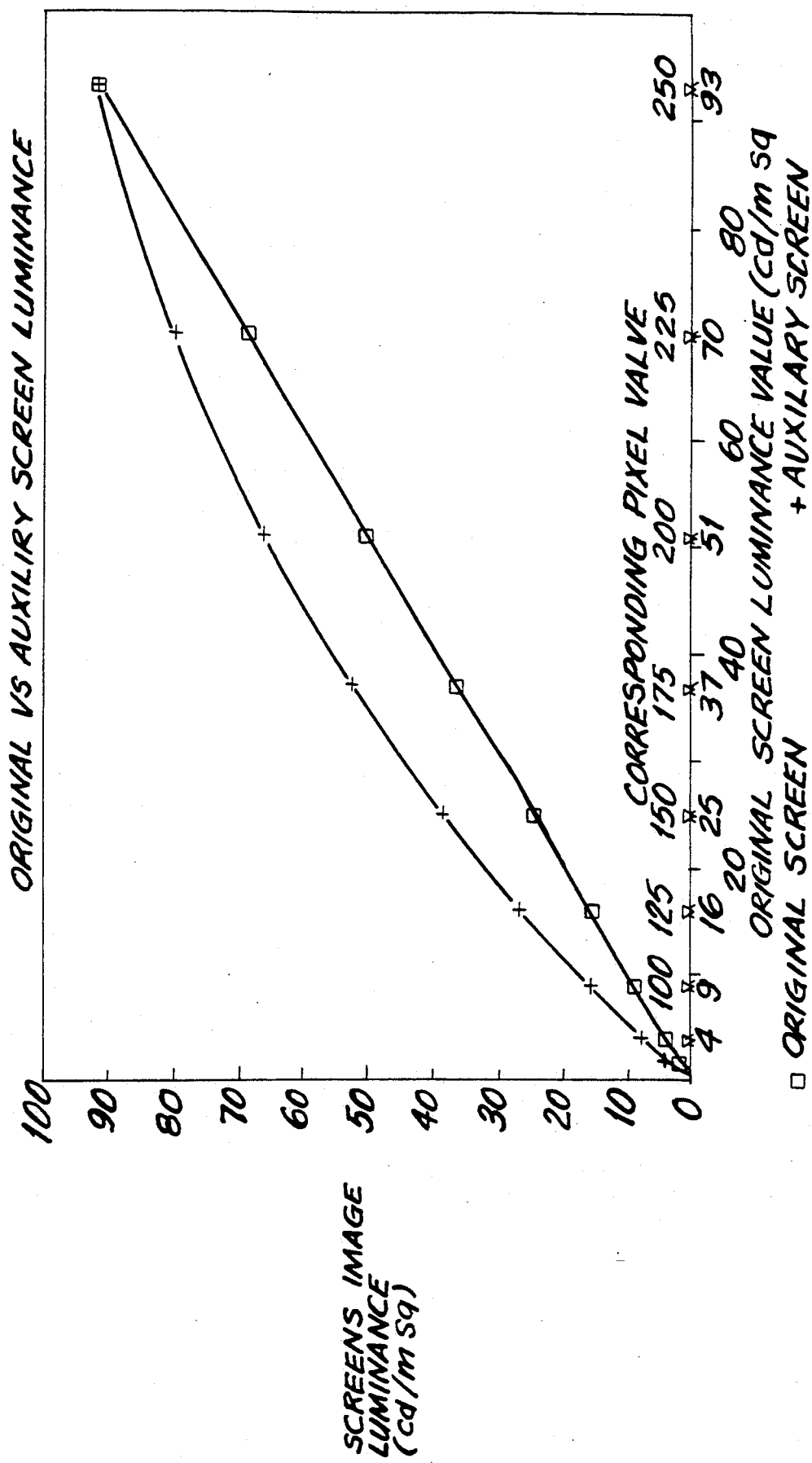
FIG. 3 is an X-Y graph in which reproduced auxiliary screen image luminance on the Y axis is plotted against the reproduced auxiliary screen pixel values (0-256) on the X axis.
Figure 4:
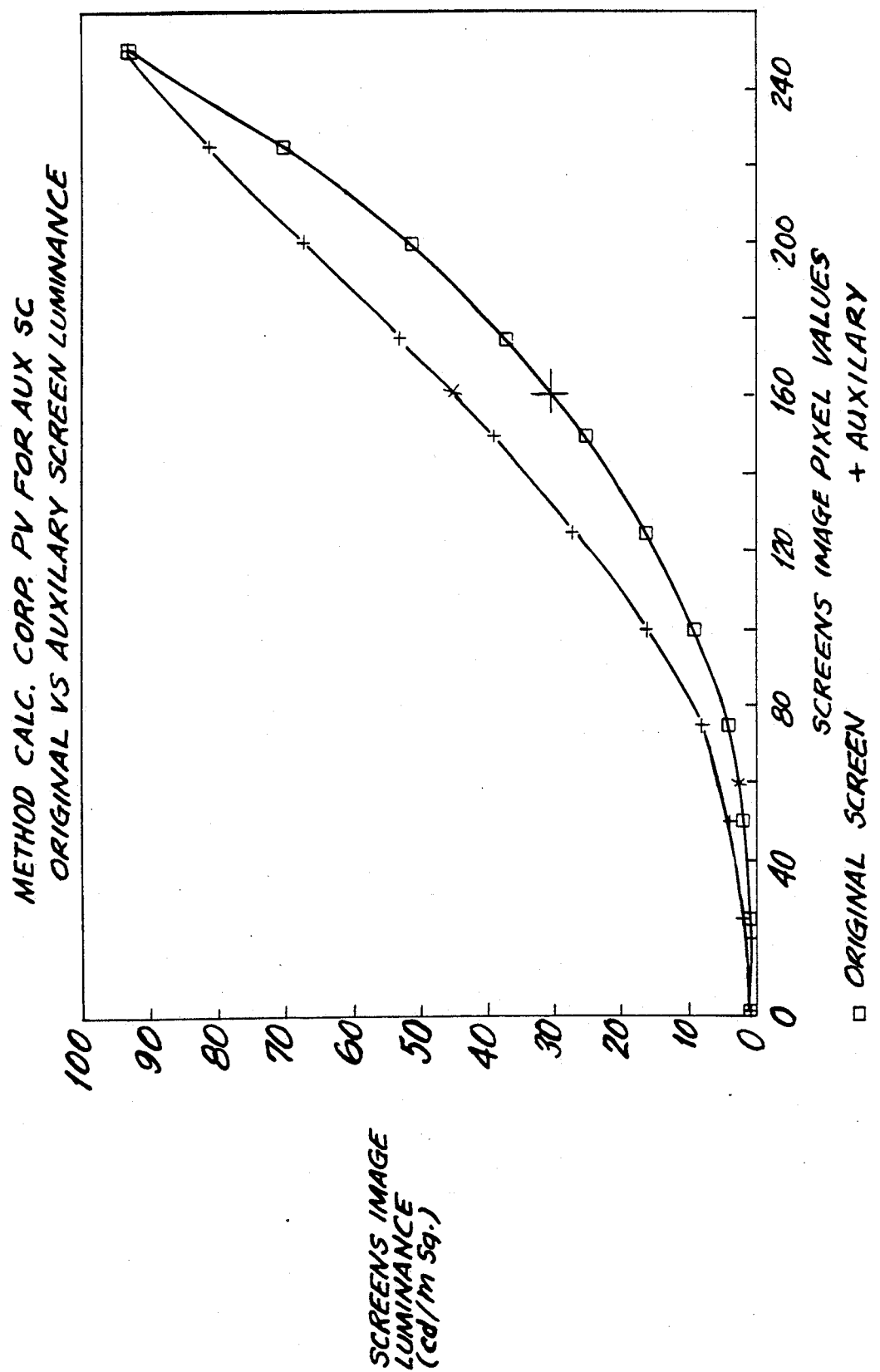
FIG. 4 is an X-Y graph in which the reproduced auxiliary screen image luminance on the Y axis is plotted against uncorrected screen pixel values.

The standard value representing the luminance of the first monitor screen is obtained as follows: The luminance value of any pixel value, at any particular screen and ambient lighting condition combination is found using the spot photometer 38. It is brought next to each panel of the test pattern, turned on to measure that panel, and a keyboard entry is made to associate the code for that panel with its measured luminance. A graph of the original screen luminance is shown in FIG. 2. The graphs of FIG. 2-4 show the actual luminance values of the auxiliary screen.

Every auxiliary second screen pixel value is associated with a corresponding first monitor signal pixel value. For example, as shown in FIG. 4 the original screen has a luminance of 31 at a pixel value of 160. To obtain that same luminance the auxiliary screen pixel value must be reduced from 160 to 135; because at 160 pixel value the auxiliary screen has a higher luminance of 46 cd/m$^2$. The values of all the first screen pixel values and their corresponding second screen pixel values are entered in the look-up table (LUT) memory 32.

Using the LUT memory 32, each second screen pixel value is changed to the corresponding corrected pixel value.

An example is as follows:

1. Generate a gray scale test pattern of known pixel values of distinct steps (e.g., the SMPTE RP-133 of 11 step panels) of pixel values, in the form of side-by-side bands. The preferred pixel values are: 1, 25, 50, 75, 100, 125, 150, 175, 200, 225, 255.
2. Measure the screen luminance values of the 11 panels on the screen of the first video monitor 20 of these pixel values with the spot photometer 38.
3. From the pixel values of step 2 construct the LUT 32. The LUT 32 will feed their values to the computer program which programs CPU 31 so that each measured second screen pixel value is changed to its appropriate corrected pixel value.

THE FOLLOWING TABLE CAN BE USED FOR ILLUSTRATION:

| 1 TEST PATTERN STEP NUMBER | 2 FIRST SCREEN PIXEL VALUES | 3 FIRST SCREEN LUMINANCE VALUES cd/m. sq | 4 SECOND SCREEN UNCORREC. PIXEL VALUES | 5 SECOND SCREEN UNCORR. LUMINANCE VALUES cd/m. sq | 6 DIFFERENCES IN 2nd SCREEN LUMINANCE VALUES cd/m. sq | 7 CORRESPONDING DIFFERENCES IN 2nd SCREEN PIXEL VALUES | 8 CORRECTED SECOND SCREEN PIXEL VALUES |
|---|---|---|---|---|---|---|---|
| 1 | 1 | 0.8 | 1 | 0.8 | 0 | 0 | 1 |
| 2 | 25 | 1 | 25 | 2 | 1 | −14 | 11 |
| 3 | 50 | 2 | 50 | 4 | 2 | −20 | 30 |
| 4 | 75 | 4 | 75 | 8 | 4 | −24 | 51 |
| 5 | 100 | 9 | 100 | 16 | 7 | −22 | 78 |
| 6 | 125 | 16 | 125 | 27 | 11 | −29 | 96 |
| 7 | 150 | 25 | 150 | 39 | 14 | −30 | 120 |
| 8 | 175 | 37 | 175 | 53 | 16 | −30 | 145 |
| 9 | 200 | 51 | 200 | 67 | 16 | −31 | 169 |
| 10 | 225 | 70 | 225 | 81 | 11 | −22 | 203 |
| 11 | 250 | 93 | 250 | 93 | 0 | 0 | 250 |
| VALUES OBTAINED FROM: | | | | | | | |
| TEST PATTERN | TEST PATTERN PIXEL VALUES | PHOTO-METER | TEST PATTERN PIXEL VALUES | PHOTO-METER | CALC. COL. 5 MINUS COL. 3 | FIG. 4 | FIG. 4 |

The following mathematical tool helps in reducing most of the labor described above:

Instead of measuring all the values of the LUT 32 (or using all the calculation values for all possible values) only the 11 values of the test pattern pixel values corresponding standard values are fed into the computer program which is programmed to intrapolate the intermediate values using (for example) polynomial calculations.

QUALITY ASSURANCE PROGRAM

Once the ideal pixel values are found and the corrections made the corrected pixel values are inserted into the signal going to the CRT screen 23.

Any periodic change in the characteristics of the monitor system (temperature, age etc.) will create a new correction curve which will be different from the standard curve previously obtained.

The same method is used to compensate for the new distortion as with the original corrections. Preferably daily a new set of LUT for the new pixel values are constructed (as before) to yield the ideal tone reproduction of the first screen image.

For example:

One assumes that the second monitor temperature has increased and the resulting image on the second screen has higher luminance compared to that required by the standard (first screen) tone reproduction relationship.

In this example only columns 5, 6, 7 and 8 in the above table should be modified:

Preferably the photometer 38 is connected to the processor 30 (computer means) via RS-232 connection. Preferably the reading is automated using a special purpose scanning spot photometer. This will allow, in this example, a simple and quick improvement of the system. All that is required is to read the 11 steps of the reproduced test pattern 37 on the second screen with the connected photometer 38 and the system calibrates itself.

To allow even the end-points to be modified when necessary the monitor is calibrated so that the required Lmax will be reached, for example, for pixel value of 25 (instead of one and the Lmin will be reached at pixel value of 225 (instead of 250) which allows automatic changes in the highest and lowest values. In this case the only additions to the graphs or calculations are the extrapolation values of the curves beyond the existing highest and lowest pixel values.

Modifications

Modifications, some of which are suggested below, may be made in the present invention within the scope of the subjoined claims.

The embodiment described above uses a digital computer and image frame memory to correct the luminance on the screen 24 of the second video monitor. Alternatively, an analog computer system may be utilized or an analog or digital system may be used in which each pixel is compensated as that pixel is being activated.

An absolute luminance reproduction, as well as the relative luminance reproduction described above, may be obtained as follows: (i) the light output of the reproduction (auxiliary screen) is controlled, for example, the intensity of the light brightness and contrast controls and (ii) the linear tone reproduction curve is maintained at 45°.

Such absolute tone reproduction is not always required and may not be desired. If a linear relationship is required, but absolute luminance reproduction is not required, the tone reproduction curve is straight, but its angle need not be 45°. For example, the 45° line may be changed to a straight line at 60° to provide reproduction with higher contrast and with linear tone reproduction, i.e., linear relationship between tones.

In those cases in which a distorted tone reproduction is required, i.e., non-linear luminance reproduction, the desired distorted image may be entered by operator manipulation of the brightness/contrast controls of the original monitor. The correction in luminance to obtain the manipulated distorted curve is then obtained and their values entered into the look-up table 32.

It may be necessary or desirable, in some applications, to make the image on the original monitor first screen be an accurate reproduction of the possibly inaccurate image in the auxiliary second screen. In principal it is actually the same procedure. Once there is obtained the screen Vs its reproduction characteristics, one distorts (compensates) the video signal to the auxiliary screen (reproduction system) to compensate for the reproduction system distortions. The signals to the original video screen are compensated to make it look like its own reproduction on the auxiliary screen. One now sees on the original monitor screen what the reproduced image will look like on the auxiliary screen before it is reproduced. The operator can correct the image on the original first screen to yield the image he desires to appear on the second screen.

As mentioned above, the present invention is application to improve the accuracy of reproduction of color images. For example, in a color system a spectrometer (color photometer) measures the values of hue, chroma and brightness of a color test pattern on the "original screen" for example, the original screen may be a color video screen of the color video monitor within a camera. The output of the spectrometer is converted, if necessary, to digital form and entered into a separate look-up table in the video processor computer to provide the first screen values of red, green and blue (R,G,B) for each pixel. A soft copy, (an image), is made of the test pattern on the second screen and the color of the test pattern is measured, for example, using the same spectrometer. The color corrections are entered into the color look-up table in the computer using the method described above in connection with tone. The second screen is then corrected, on a pixel-by-pixel basis, using the corrections from the color look-up table. Preferably both tone and color are corrected to produce accurate color reproductions.

The term "original screen", as used herein, in the above-described embodiment refers to the screen 21 of the video monitor 20. The screen 23 of the auxiliary (second) monitor is corrected to produce an accurate image reproduction. In a multi-monitor system, in which a plurality of video screens are corrected to match the first video screen, each video monitor (the second through nth monitors) is connected to its own video processor computer and its screen ("reproduced screen") is corrected on a pixel-by-pixel basis to match the image on the first video monitor, so that viewers see the same gray scale and/or color on all the monitors.

An another modification, the method and system of the present invention may be used in a multi-monitor system, such as the present commercial TV systems or high definition TV systems. For example, flexible fiber optic strands are connected to the face plates of color TV sets at the outer edge of the screen and beneath the frame, so they are not visible. The test pattern is produced in sequence to cover the entire screen, i.e. gray in 10 tones, blue of a defined hue, and a saturation etc., then red of a defined hue and saturation et. The fiber optic strands, each of which have a color lens to filter out unwanted colors, transmit the detected sequential test pattern to an electro-optical transducer, preferably a phototransistor. One fiber-optic-transducer system is a type of photometer and spectrometer which provides an electrical output proportional to the detected light at the selected frequency. The TV set has a built-in video processor computer, of the type described above, which controls the brightness, contrast and color of the TV set.

The corrections are made against a first set of measurements, for example taken at a studio monitor (first monitor) and broadcast, in digital code, to the TV sets to provide the standard. In this system, each TV set, regardless of its manufacturer, age, ambiant lighting, condition of its CRT etc., will obtain an accurate gray scale and color reproduction of the image on the studio monitor.

The studio monitor may itself be adjusted to provide an accurate color and gray scale image by comparing color and gray scale test pattern images on its screen, using a photometer and spectrometer, with a photographed object test pattern measured by a similar photospectrometer. In this case the first set of data is obtained from the original photographed object and the second set is obtained from the studio monitor and the two sets are compared to derive the corrections for the studio monitor.

In the embodiment described above, the screen was divided into one million pixels. However, the number of pixels is at least 100,000 and may be as many as ten million.

Distortions in the CRT tube may be corrected. For example, some areas of the CRT tube screen may be manufactured with insufficient phosphors and consequently those areas have less luminance than the remainder of the screen. Such screen distortions may be compensated as follows: (i) a test image, preferably a uniformly gray image of a single tone, is shown on the video screen which is to be corrected, (ii) a photometer having a small view area is moved over the screen to produce luminance values at selected pixels. Preferably the selected pixels are evenly spread over the face of the screen. For example, the screen may be covered by a mask having 600 holes in a 30 by 20 pattern. The pixels which are seen through the holes are measured in a predetermined order, for example starting at the top left and moving right one row, down one row and right etc. so that each measurement is associated by code, with a particular pixel location, (iii) The pixel-by-pixel luminance values are entered into the computer (video processor 30), (iv) these pixels whose luminance values are greater then a predetermined percentage, i.e., 10%, from the standard (the mean luminance values of the screen) are entered, by corresponding screen pixel location, into a separate computer memory screen distortion compensation look-up table, along with the compensation values for those pixels of the deviant area, and (vi) the video screen is compensated on a pixel-by-pixel basis, using the screen distortion look-up table for each video frame. In this way the pixels' brightness are compensated for their tonal differences from the original, taking into account the possible geometric tonal distortion (unevenness) of the monitor screen.

I claim:

1. The method reproducing a series of images on a second video screen of a second video monitor which are accurate tone reproductions of the luminance ratios of the video images on a first video screen of a first video monitor including the steps of:
   (a) forming a gray scale test video image on the first and second video screens; wherein said second video monitor includes electronic means to vary the luminance values on said second screen on a pixel-by-pixel basis, said test images having predetermined tone scales including defined areas differing in luminance ratios;
   (b) luminance measuring the differences in luminance in the gray scale on the first screen to obtain a first set of luminance difference values using a photoelectric photometer and entering the first set of luminance difference values into a computer having computer memory and storing said first set in the computer memory;
   (c) luminance measuring the differences in luminance in the gray scale on the second screen to obtain a second set of luminance difference values using a photoelectric photometer and entering the second set of luminance difference values into the computer;
   (d) in the computer, comparing said entered second set of luminance values with said first set of luminance values stored in computer memory;
   (e) using the computer to generate a set of corrections for each luminance value for each pixel of said second screen, and
   (f) altering the tones on the second video screen according to said set of computer produced corrections by altering the settings of the electronic means of said second video device.

2. The method of reproducing a series of images on a second video screen of a second video monitor which are of accurately reproduced luminance values of the video images on a first video screen of a first video monitor including the steps of:
   (a) forming a gray scale test video image on the first video screen and the second video screen, wherein the second video monitor includes electronic means to vary the luminance values on said second screen on a pixel-by-pixel basis, the test images having predetermined tone scales including defined areas differing in luminance and wherein said first and second video monitors each have screen brightness and contrast controls;
   (b) adjusting the brightness and contrast controls of said second video monitor so that the highest and the lowest luminance values on the second video screen are the same as the highest and lowest luminance values of the first video screen;
   (c) luminance sensing the luminance values in the gray scale on the first and second screens using a photoelectric photometer and entering the sensed luminance values into a computer;
   (d) comparing said entered luminance values from said second screen with a set of numerical correction values stored in computer memory representing the luminance values of the measured first video screen;
   (e) calculating in the computer a set of corrections for each luminance value for each pixel of said second screen, and altering the luminance values on the second video screen according to said set of computer produced corrections by altering the settings of the electronic means of said second video device.

3. The method of reproducing a series of images on a second video screen of a second video monitor which are accurate tone reproductions of the luminance ratios of the video images on a first video screen of a first video monitor including the steps of:
   (a) forming a color test video image on he first and second video screens having differences in the values of hue, chroma and brightness: wherein said second video monitor includes electronic means to vary the hue, chroma and brightness values on said second screen on a pixel-by-pixel basis;
   (b) measuring the differences in hue, chroma and brightness in the test image on the first screen to obtain a first set of color values using a color photoelectric photometer and entering the first set of color values into a computer having computer memory and storing said first set in the computer memory;
   (c) measuring the differences in hue, chroma and brightness in the test image on the second screen to obtain a second set of color values using a color photoelectric photometer and entering the second set of color values into the computer;
   (d) in the computer, comparing said entered second set of color values with said first set of color values stored in computer memory;
   (e) using the computer to generate a set of corrections for each color value for each pixel of said second screen, and
   (f) altering the colors on the second video screen according to said set of computer produced corrections by altering the settings of the electronic means of said second video device.

4. The method of reproducing a series of images on a video screen of a video monitor which are accurate tone reproductions of the luminance ratios of the images of an object including the steps of:
  (a) forming a gray scale test pattern at the object and a gray scale test video image on said video screen; wherein said video monitor includes electronic means to vary the luminance values on said screen on a pixel-by-pixel basis, said test image and test pattern each having predetermined tone scales including defined areas differing in luminance ratios;
  (b) measuring the differences in density in the gray scale on the test pattern to obtain a first set of values using a photoelectric densitometer and entering the first set of values into a computer having computer memory and storing said first set in the computer memory;
  (c) luminance measuring the differences in luminance in the gray scale on the screen to obtain a set of luminance difference values using a photoelectric photometer and entering the set of luminance difference values into the computer;
  (d) in the computer, comparing said entered second set of luminance values with said first set of values stored in computer memory;
  (e) using the computer to generate a set of corrections for each luminance value for each pixel of said screen, and
  (f) altering the tones on the video screen according to said set of computer produced corrections by altering the settings of the electronic means of said video device.

5. The method of reproducing a series of images on a video screen of a video monitor which are accurate color reproductions of the hue, chroma and brightness of an object, including the steps of:
  (a) forming a color test video image on the video screen and a color test pattern at the object; wherein said video monitor includes electronic means to vary the hue, chroma and brightness values on said screen on a pixel-by-pixel basis, said test image and test pattern having predetermined defined areas differing in hue, chroma and brightness;
  (b) measuring the differences in hue, chroma and brightness in the test pattern to obtain a first set of color values using a photoelectric color photometer and entering the first set of color values into a computer having computer memory and storing said first set in the computer memory;
  (c) measuring the differences in hue, chroma and brightness in the test image on the screen to obtain a second set of color values using a photoelectric photometer and entering the second set of color values into the computer;
  (d) in the computer, comparing said entered second set of color values with said first set of color values stored in computer memory;
  (e) using the computer to generate a set of corrections for each color value for each pixel of said screen, and
  (f) altering the colors on the video screen according to said set of computer produced corrections by altering the settings of the electronic means of said video device.

6. The method as in claims 1, 2 or 3 wherein said second screen is a LCD (liquid crystal display).

7. The method as in claims 1, 2 or 3 wherein said second screen is the screen of a CRT (cathode ray tube).

8. The method as in claims 1, 2, 3, or 4 wherein the photometer output produces electrical signals and including the step of automatically entering said photometer signals into said computer by connecting said electrical signal output to said computer.

9. The method of claims 1 or 2 wherein said luminance sensing of said second screen and entering into the computer of the second set of sensed luminance values is done on a daily basis, during days the second video monitor is used.

10. The method of claim 1 wherein first and second sets are derived from different tone panels of the test image.

11. A system for producing a series of images on a second video screen of a second video monitor which are accurate tone reproductions of the luminance ratios of the video images on a first video screen of a first video monitor including;
  (a) first and second video monitors having first and second video screens, respectively, said second video monitor including electronic means to vary the luminance values on said second screen on a pixel-by-pixel basis.
  (b) means for forming a gray scale test video image on the first and second video screens; said test images having predetermined tone scales including defined areas differing in luminance ratios;
  (c) photoelectric photometer means for measuring the luminance values in the gray scale on the first and second screens to obtain first and second sets of luminance values, a computer having a computer memory and computer interface means connected to said photometer means for entering the measured luminance values of said first set into computer memory and entering the second set into the computer;
  (d) comparison means within said computer for comparing said entered second set of luminance values with said first set of values stored in computer memory;
  (e) correction computer means within said computer to produce a set of corrections for each luminance value for each pixel of said second video screen based upon said comparison; and
  (f) video tone altering means for altering the tones on the second video screen according to said set of computer produced corrections.

12. A system for producing a series of images on a second video screen of a second video monitor which are accurate color reproductions of the hue, chroma and brightness of the video images on a first video screen of a first video monitor including;
  (a) first and second video monitors having first and second video screens, respectively, said second video monitor including electronic means to vary the color values on said second screen on a pixel-by-pixel basis.
  (b) means for forming a color test video image on the first and second video screens; said test images having predetermined defined areas differing in hue, chroma and brightness;
  (c) photoelectric color photometer means for measuring the values hue, chroma and brightness on the first and second screens to obtain first and second sets of color values, a computer having computer memory and computer interface means connected to said photometer means for entering the measured color values of said first set into computer memory and entering the second set into the computer;
(d) comparison means within said computer for comparing said entered second set of color values with said first set color values stored in computer memory;
(e) correction computer means within said computer to produce a set of corrections for each color value for each pixel of said second video screen based upon said comparison; and
(f) video tone altering means for altering the tones on the second video screen according to said set of computer produced corrections.

* * * * *